(12) United States Patent
Stella et al.

(10) Patent No.: US 7,024,314 B1
(45) Date of Patent: Apr. 4, 2006

(54) SEWERAGE PIPE INSPECTION VEHICLE HAVING A GAS SENSOR

(76) Inventors: Alfred Stella, 3600 Rio Vista Ave., Orlando, FL (US) 32805; Ray Boyles, 3600 Rio Vista Ave., Orlando, FL (US) 32805

( * ) Notice: Subject to any disclaimer, the term of this patent is extended or adjusted under 35 U.S.C. 154(b) by 0 days.

(21) Appl. No.: 11/003,226

(22) Filed: Dec. 3, 2004

Related U.S. Application Data

(62) Division of application No. 10/300,313, filed on Jun. 7, 2002, now Pat. No. 6,832,164.

(60) Provisional application No. 60/331,824, filed on Nov. 20, 2001.

(51) Int. Cl.
*G06F 19/00* (2006.01)
*G06F 7/00* (2006.01)

(52) U.S. Cl. .......................... 702/31; 701/29

(58) Field of Classification Search .................. 702/31; 701/29, 23; 901/1; 318/568.12, 587; 405/154.1; 73/865.8; 180/167
See application file for complete search history.

(56) References Cited

U.S. PATENT DOCUMENTS

| | | | |
|---|---|---|---|
| 4,246,604 A * | 1/1981 | Hundertmark et al. | 348/84 |
| 4,372,161 A | 2/1983 | de Buda et al. | |
| 4,621,532 A | 11/1986 | Takagi et al. | |
| 4,862,808 A | 9/1989 | Hedgcoxe et al. | |
| 5,363,935 A | 11/1994 | Schempf et al. | |
| 5,435,405 A | 7/1995 | Schempf et al. | |
| 5,892,163 A * | 4/1999 | Johnson | 73/865.8 |
| 6,035,786 A | 3/2000 | McKay et al. | |
| 6,101,951 A * | 8/2000 | Sigel | 104/138.2 |
| 6,107,795 A | 8/2000 | Smart | |
| 6,108,597 A * | 8/2000 | Kirchner et al. | 701/23 |
| 6,111,600 A * | 8/2000 | McLeod et al. | 348/84 |
| 6,845,819 B1 * | 1/2005 | Barrett et al. | 166/250.01 |
| 6,853,200 B1 * | 2/2005 | Munser et al. | 324/642 |

OTHER PUBLICATIONS

Eiswirth et al., Pipe Defect Characterization by Multi-Sensor Systems, Oct. 15-18, 2000, 18 Int. Conf. No-Dig 2000.*

* cited by examiner

*Primary Examiner*—Bryan Bui
*Assistant Examiner*—Toan M. Le
(74) *Attorney, Agent, or Firm*—Allen, Dyer, Doppelt, Milbrath & Gilchrist, P.A.

(57) ABSTRACT

An apparatus and method for inspecting sewerage pipes, including in combination with a first mobile pipe vehicle, a gas sensor vehicle for detecting pipe ambient gas. The combination includes an interface cable conveying power and operably connecting the combination to a control station positioned outside the pipe, a second vehicle having a support frame connected to the first mobile pipe vehicle, a gas sensor positioned on the second vehicle support frame and connected to the interface cable for sensing pipe ambient gas level, and a transceiver communicating with the gas sensor and connected to the interface cable for therethrough communicating with the control station. The second vehicle is preferably connected to the first mobile pipe vehicle by the interface cable and is thereby towed in the pipe.

21 Claims, 4 Drawing Sheets

SEWERAGE PIPE INSPECTION VEHICLE HAVING A GAS SENSOR

RELATED APPLICATION

This application is a divisional application of Ser. No. 10/300,313, filed on Jun. 7, 2002 now U.S. Pat. No. 6,832,164, which application claimed priority to provisional application Ser. No. 60/331,824, filed on Nov. 20, 2001.

FIELD OF THE INVENTION

This invention relates to sewerage systems, and more specifically to a remotely controlled, gas sensing sewerage pipe vehicle for inspection or repair of sewerage pipes.

BACKGROUND OF THE INVENTION

Modern sewerage systems are often inspected for breaks, cracks, spalling of pipe, poor joints, and other defects by using waterproof video equipment mounted on a mechanical device which can be remotely operated while it crawls along sewerage pipes, or is towed on a skid or skate. Of course, it has been long recognized, that organic matter is undergoing decomposition within the confined spaces such as found within a sewerage system. Decomposition of organic matter may proceed with the generation of various gases, some of which may be toxic to humans, and some of which may be explosive when in sufficient concentration. Human toxicity of these gases may be aggravated by the low oxygen concentration expected in the sewerage system. Often, before entering a manhole, personnel must wait until the space has been ventilated mechanically for a period of time, and must then test the area for gases. Partly for this reason it is typically required that at least two people work together when entering a sewerage system, and that those entering wear a safety harness.

Additionally, there is some concern in the industry that the concentration of certain gases may rise sufficiently within the sewerage system to produce an explosive mixture. This concern relates to pipe crawler devices which may generate a gas igniting spark through their electrical or mechanical components. Because of industry concern, the possible establishment of standards is being explored to require that remotely controlled pipe crawlers be fabricated incorporating "explosion proof" technology, which is intended to substantially reduce or eliminate the risk of spark generation by the device. Such explosion proof equipment will be more difficult to manufacture, and consequently will be more expensive.

SUMMARY OF THE INVENTION

With the foregoing in mind, the present invention provides an alternative approach addressing industry concern over potential explosions or toxic levels of gas found during sewerage pipe inspections. The invention comprises a pipe vehicle which includes a gas sensor for detecting a predetermined level of potentially explosive gas. Responsive to the sensor, an alarm could be generated, or power to the vehicle could be interrupted before the level of gas rises sufficiently above a danger level, for example for flammability or for sustaining an explosion. The skilled should recognize that the invention is intended to include any other pipe vehicle device useful for inspection, maintenance, and repair of sewerage pipes, including for example cameras, cutters, packers and other grouting equipment, and the like. These devices are referred to herein collectively by the generic designation "pipe vehicle."

BRIEF DESCRIPTION OF THE DRAWINGS

Some of the features, advantages, and benefits of the present invention having been stated, others will become apparent as the description proceeds when taken in conjunction with the accompanying drawings, presented for solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description, and from the claims.

Figure 1:
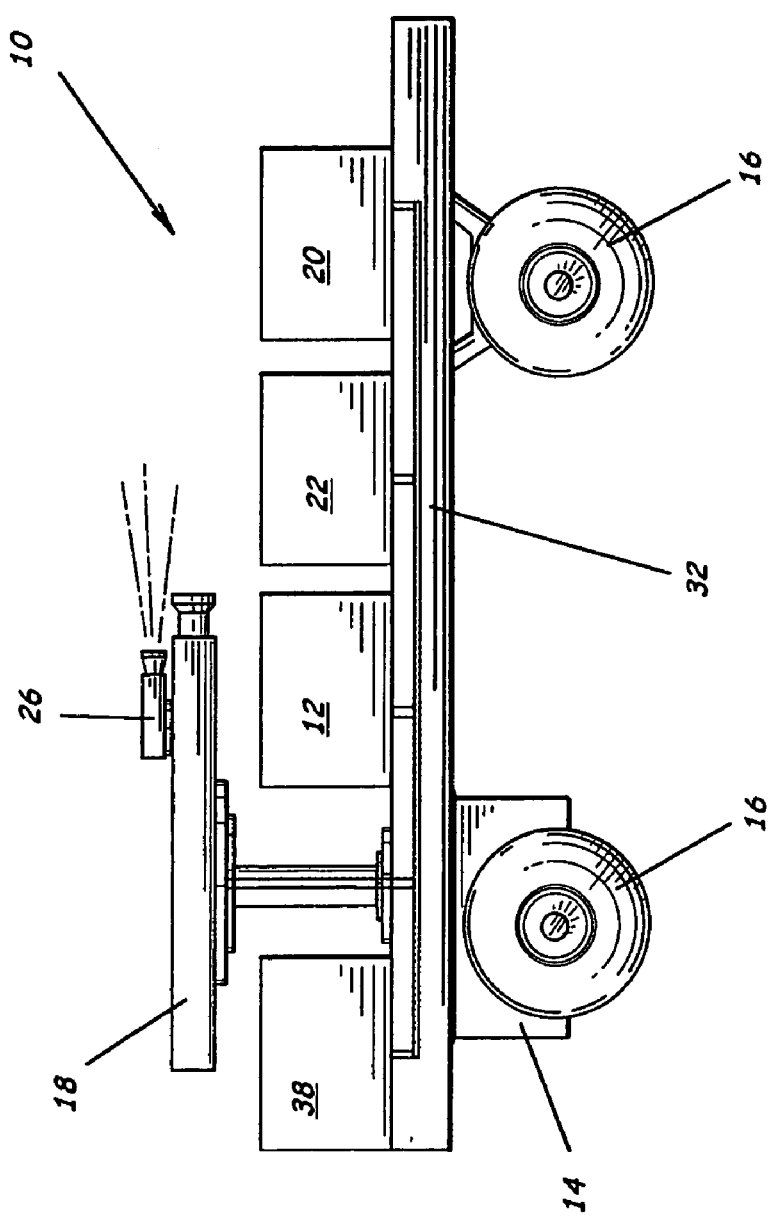
FIG. 1 is a mobile vehicle apparatus for pipe inspection, according to an embodiment of the present invention.

One embodiment of the present invention comprises a mobile vehicle apparatus 10 for pipe inspection, as illustrated in FIG. 1. The vehicle apparatus 10 includes a power source 12, a motor 14 connected to the power source, at least one endless member 16 driven by the motor, a camera 18 connected to the power source, a sensor 20 operably connected for sensing ambient gas level, and a controller 22 responsive to the sensor and programmed to generate an alarm signal at a predetermined sensed ambient gas level approaching a danger level. In this embodiment the controller 22 is preferably programmed to interrupt flow of power to the apparatus 10 at a predetermined sensed ambient gas danger level, which could be a flammable level, an explosive level, or a human toxic level.

The power source 12 in this first embodiment of the invention may comprise an on-board power source carried by the apparatus, and is preferably a direct current power source. The power source 12, however, may also comprise a power source remote to the apparatus, wherein the apparatus 10 further comprises an interface cable 24 connecting the apparatus to the remote power source as shown in FIG. 2.

Other features in this first embodiment include for moving along on the inside of the pipe, at least one endless member 16 which may preferably comprise a wheel, or an endless track. A camera 18 comprising still images or more desirably a digital video camera for capturing moving video images is included in the vehicle. A light source 26 may be connected in the electrical circuit for providing lighting for the camera.

Figure 2:
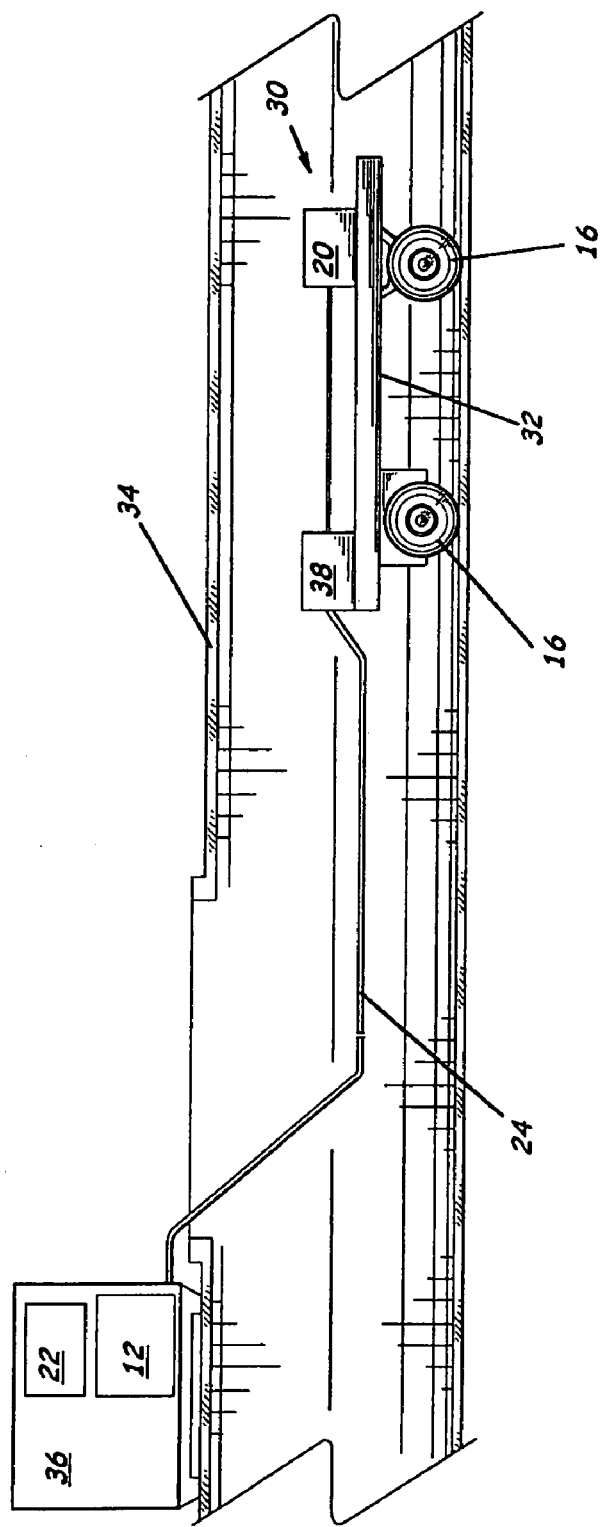
FIG. 2 a gas sensor apparatus for pipe inspection according to an embodiment of the invention of FIG. 1.

Another preferred embodiment of the invention includes a gas sensor apparatus 30 for pipe inspection, as seen in FIG. 2. The apparatus 30 comprises a support frame 32 adapted for supporting the apparatus for travel within the pipe 34. An interface cable 24 conveys power and operably connects the apparatus 30 to a control station 36 positioned outside the pipe 34. A gas sensor 20 is connected to the interface cable 24 for sensing pipe 34 ambient gas level. A transceiver 38 communicates with the sensor 20 and is connected to the interface cable 24 for therethrough communicating with the control station 36.

Optional features of this additional embodiment include wherein the control station 36 further comprises a controller 22 responsive to the gas sensor 20 and programmed to generate an alarm signal at a predetermined sensed pipe ambient gas level. As in the first embodiment, the predetermined pipe ambient gas level may comprise a level approaching flammability, an explosive level, or a human toxic level. Further, the controller 22 is desirably further programmed to interrupt power flow to the apparatus 30 at a predetermined sensed pipe ambient gas level. The support frame 32 may comprise at least one endless member 16 adapted for travel through the pipe, the endless member selected from a skid, a track, and a wheel. The skilled should note that a vehicle having one or more skids on a support frame is designed to be passively moved through the pipe, preferably towed by another pipe vehicle. The preferred gas sensor 20 comprises a source of infrared light and, more specifically, a laser source. It should be understood that the power source may provide direct current.

Figure 3:
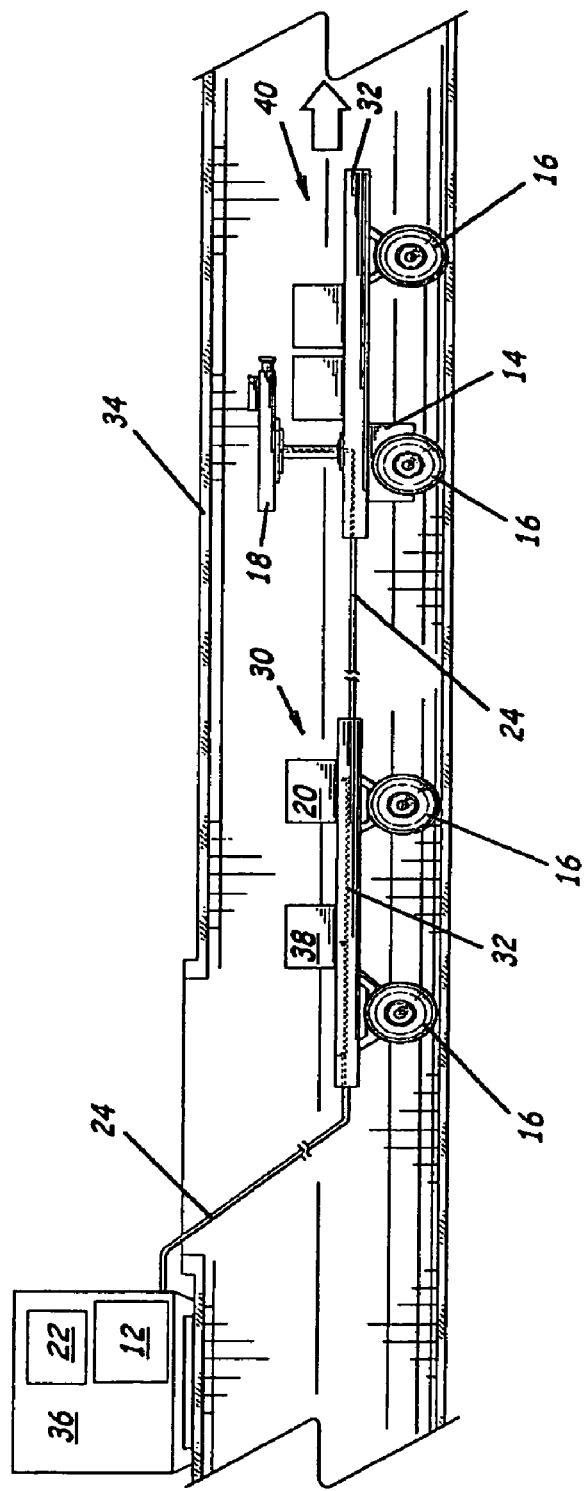
FIG. 3 a combination of the present invention including a first mobile pipe vehicle, and a gas sensor vehicle for detecting pipe ambient gas.

Yet another embodiment of the invention, shown in FIG. 3, includes in combination with a first mobile pipe vehicle 40, a gas sensor vehicle 30 for detecting pipe ambient gas. The combination comprises an interface cable 24 conveying power and operably connecting the combination to a control station 36 positioned outside the pipe, a second vehicle 30 having a support frame connected to the first mobile pipe vehicle 40, a gas sensor 20 positioned on the second vehicle support frame 32 and connected to the interface cable 24 for sensing pipe ambient gas level, and a transceiver 38 communicating with the gas sensor and connected to the interface cable for therethrough communicating with the control station.

In this combination the second vehicle 30 is preferably connected to the first mobile pipe vehicle 40 by the interface cable and is thereby towed in the pipe. The first mobile pipe vehicle 40 may be selected from a pipe inspection vehicle, a pipe repair vehicle, and combinations thereof. The second vehicle support frame 32 further comprises at least one endless member 16 adapted for travel through the pipe, the endless member selected from a skid, a track, and a wheel.

In the combination, the control station 36 may further comprise a controller 22 responsive to the gas sensor 20 and programmed to generate an alarm signal at a predetermined sensed pipe ambient gas danger level. The predetermined pipe ambient gas danger level is most desirably selected from a flammable level, an explosive level, and a human toxic level. Optionally, the controller 22 may be further programmed to interrupt power flow to the first mobile pipe vehicle 40 at a predetermined sensed pipe ambient gas level, or may interrupt power to the combination. As previously noted, the gas sensor 20 may include a source of infrared light, preferably a laser source.

It should be understood that in any of the invention's embodiments, and particularly when employing first and second vehicles, an interface cable 24 may carry both power and communication signals between the pipe vehicles and a control station 36, a controller or processor being able to insert and extract the communication signals in and out of the interface cable. In this manner, a second vehicle 30 may be connected to a first mobile pipe vehicle 40 by the interface cable and be towed thereby as shown in FIG. 3. Thus, the second vehicle can be connected in-line with a pipe vehicle to add gas sensing capability to any prior pipe inspection or repair vehicle system.

Figure 4:
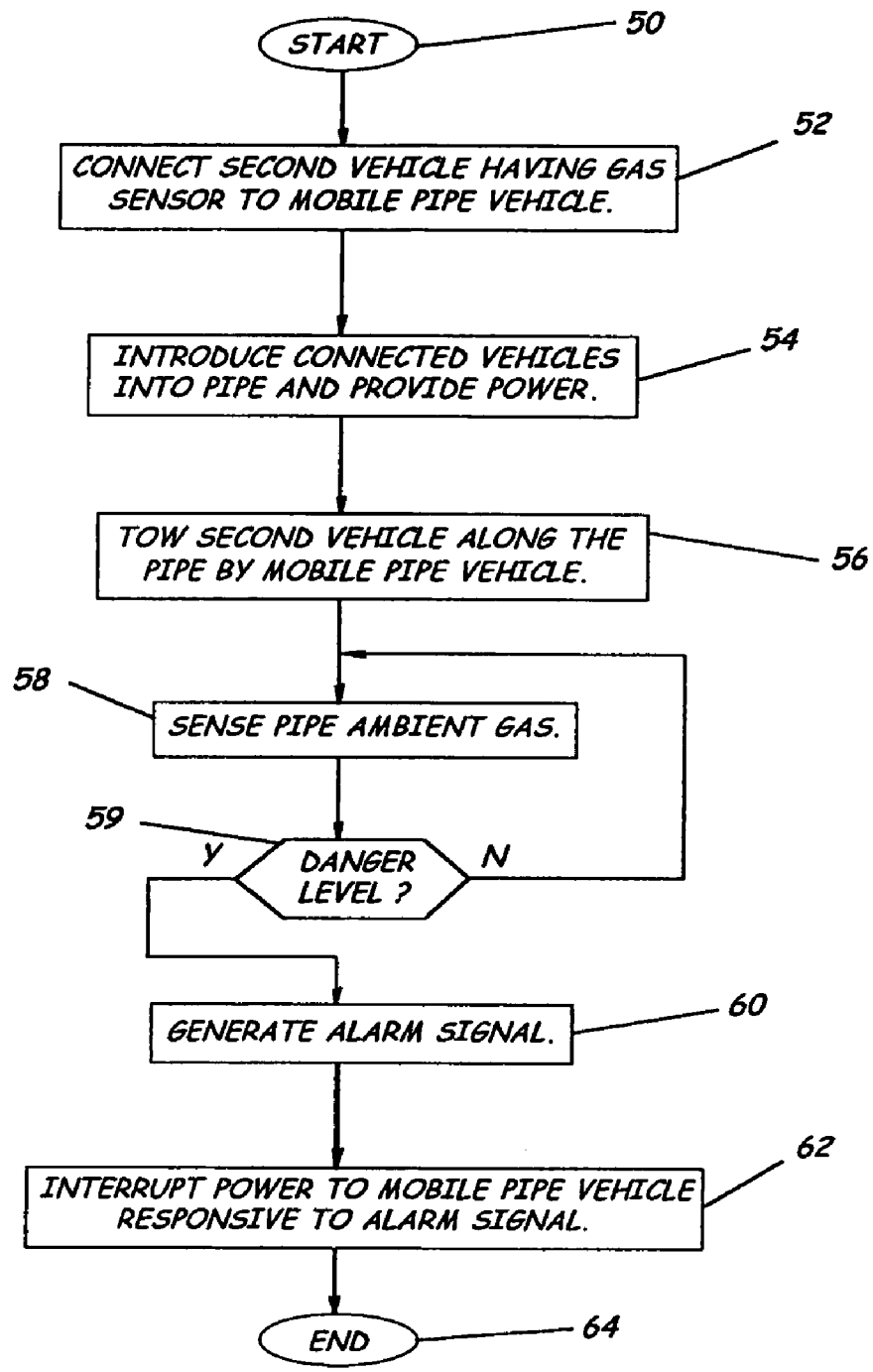
FIG. 4 is a block diagram illustrating a method of the invention.

The invention also includes methods of inspecting sewerage pipes, illustrated in the block diagram shown in FIG. 4. A preferred embodiment of the method includes introducing 54 a mobile vehicle into the pipe and providing power to the vehicle so as to move the vehicle through the pipe, sensing pipe ambient gas with a gas sensor operably connected to the mobile pipe vehicle, and generating an alarm signal responsive to a sensed pipe ambient gas danger level.

The method starts 50 by connecting a gas sensor to a mobile pipe vehicle 52 and introducing 54 into a pipe to be inspected. Most preferably a second pipe vehicle towed by the mobile vehicle 56. Alternatively, the sensor could be simply connected to the mobile vehicle and pushed along in the pipe ahead of the mobile vehicle. Sensing 58 may result in generating 60 an alarm if a pipe ambient gas danger level is detected, the danger level selected from a flammable level, an explosive level, and a human toxic level. The alarm signal may also interrupt power 62 to the mobile vehicle, wherein the method stops 64.

Following is an example of the present invention, which is offered to provide sufficient detail for those skilled in the art to fully understand the apparatus and without intent to limit the invention to the example described. A preferred sensor is an infrared hydrocarbon gas detection sensor that mounts on a skid or skate and travels through the pipe, pulled behind a first pipe vehicle, also called a transporter, or other in-pipe equipment. The sensor monitors combustible gas concentrations in the vicinity of the equipment as the equipment is in operation. The gas detector assembly is designed to be employed together with currently available transporters, cameras, cutters, lateral inspection equipment, and grouting components without modification to them, and without affecting the performance of their normal functions.

The typical apparatus comprises two assemblies: a gas sensing assembly, or gas detector, which operates inside the pipe, and a control station, also sometimes referred to as a receiver assembly, located with the above-ground equipment.

The gas sensing assembly includes the gas sensor and the transceiver electronics. The transceiver electronics are preferably housed in a water resistant or watertight housing that mounts to a support frame which is tethered to and pulled behind the in-pipe equipment. It should be understood that the in-pipe equipment is generally self-propelled, whereas the gas sensing assembly does not need to be. The housing also includes the mechanical and electrical interface for the gas sensor. The gas sensing assembly most desirably connects in-line, electrically and mechanically, between the interface cable and the in-pipe equipment. In an embodiment which senses a flammable ambient gas, the gas sensor outputs an electrical signal which is proportional to the combustible gas concentration in percent LFL (Lower Flammability Limit). This electrical signal is then modulated by the transceiver electronics and coupled onto the DC power supply line in the interface cable. The gas sensor and transceiver electronics use the same power source that runs the in-pipe equipment, minimizing the need for additional truck-mounted power supplies and allowing the use of the existing interface cable without additional dedicated wires.

The control station, or receiver assembly comprises a transceiver and an interface panel, both of which are typically located in the truck or rack with the existing inspection equipment. The transceiver connects in line with the interface cable, removes the sensor signal from the DC power supply line, and processes it for analysis and display. This signal is then sent to the interface panel, which may include a numeric display for percent LFL, as well as status lights for test, error, and camera power. A predetermined LFL threshold level, typically 10%, triggers an audible and/or visible alarm, telling an operator that a potentially explosive environment exists. A shutoff switch is provided on the interface panel that disconnects all power and signals going to the in-pipe equipment, with the exception of DC power running the gas sensor assembly itself, which continues to monitor and transmit gas concentration levels even when the in-pipe equipment has been shut down. A reset switch, also located on the interface panel, is provided to reapply power to the in-pipe equipment when the gas concentration levels have been reduced to safe levels.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A mobile vehicle apparatus for sewer pipe inspection, comprising:
    a power source;
    a motor connected to said power source;
    at least one endless member driven by said motor;
    a camera connected to said power source;
    a sensor operably connected for sensing sewer pipe ambient gas level; and
    a controller responsive to said sensor and programmed to generate an alarm signal at a predetermined sensed ambient gas level approaching a danger level.

2. The apparatus of claim 1, wherein said controller is further programmed to interrupt flow of power to said apparatus at a predetermined sensed ambient gas level.

3. The apparatus of claim 1, wherein said danger level is near a flammable level.

4. The apparatus of claim 1, wherein said danger level is near an explosive level.

5. The apparatus of claim 1, wherein said danger level is near a human toxic level.

6. The apparatus of claim 1, wherein said power source comprises an on-board power source carried by said apparatus.

7. The apparatus of claim 1, wherein said power source comprises a power source remote to said apparatus and said apparatus further comprises an interface cable connecting said apparatus to said remote power source.

8. The apparatus of claim 1, wherein said at least one endless member comprises a track.

9. The apparatus of claim 1, wherein said at least one endless member comprises a wheel.

10. The apparatus of claim 1, wherein said camera comprises a digital video camera capable of capturing moving video images.

11. The apparatus of claim 1, further comprising a light source for providing lighting for said camera.

12. A gas sensor apparatus for sewer pipe inspection, comprising:
    a support frame adapted for travel within the pipe;
    an interface cable operably connecting said apparatus to a control station positioned outside the pipe;
    a gas sensor for sensing pipe ambient gas level; and
    a transceiver communicating with said sensor and connected to said interface cable for therethrough communicating with the control station.

13. The apparatus of claim 12, further comprising a controller responsive to said gas sensor and programmed to generate an alarm signal at a predetermined sensed sewer pipe ambient gas level.

14. The apparatus of claim 13, wherein said predetermined sewer pipe ambient gas level comprises a level approaching flammability.

15. The apparatus of claim 12, wherein said controller is further programmed to interrupt power flow to said apparatus at a predetermined sensed sewer pipe ambient gas level.

16. The apparatus of claim 13, wherein said sewer pipe ambient gas level comprises an explosive level.

17. The apparatus of claim 13, wherein said sewer pipe ambient gas level comprises a human toxic level.

18. The apparatus of claim 12, wherein said support frame further comprises at least one endless member adapted for travel through the pipe, said endless member being selected from a skid, a track, a wheel, and combinations thereof.

19. The apparatus of claim 12, wherein said gas sensor comprises a source of infrared light.

20. The apparatus of claim 12, wherein said gas sensor comprises a laser source.

21. The apparatus of claim 12, wherein power comprises direct current.

* * * * *